UNITED STATES PATENT OFFICE.

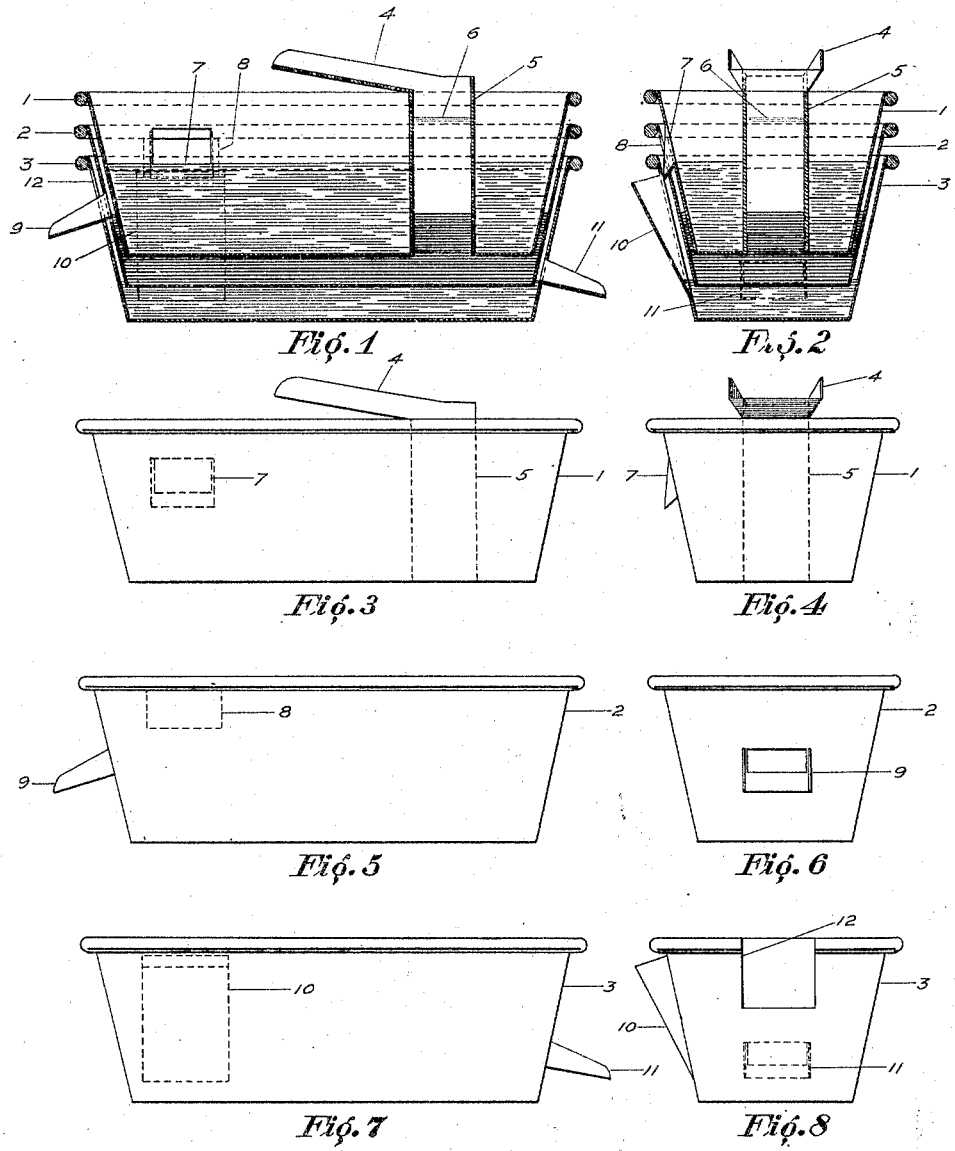

THOMAS EDWARD HOOKER, OF DOS PALOS, CALIFORNIA.

CREAM-COOLER.

1,308,357. Specification of Letters Patent. Patented July 1, 1919.

Application filed October 6, 1916. Serial No. 124,075.

*To all whom it may concern:*

Be it known that I, THOMAS EDWARD HOOKER, citizen of the United States, residing at Dos Palos, in the county of Merced and State of California, have invented certain new and useful Improvements in Cream-Coolers, of which the following is a specification.

This invention relates to improvements in liquid cooling devices and more particularly to cream coolers.

The principal object of my invention is to provide an improved device of the character named, which may readily be dismantled and thoroughly cleansed.

Another object of my invention is to provide a device so simple in construction that broken and damaged pieces may be quickly and cheaply supplied.

With these and other objects in view, my invention consists in the novel construction and combination of elements as herein described and specifically pointed out in the appended claims.

Reference should be had to the accompanying drawing forming a part of this specification, wherein—

Figure 1 is a longitudinal sectional elevation of a series of pans showing my improved cream cooling device in operating position.

Fig. 2 is a view of a sectional end elevation.

Fig. 3 is a side view of the upper pan.
Fig. 4 is an end view of the upper pan.
Fig. 5 is a side view of the middle pan.
Fig. 6 is an end view of the middle pan.
Fig. 7 is a side view of the lower pan.
Fig. 8 is an end view of the lower pan.

Referring to corresponding parts by the same numerals of reference in the several views, 1 designates the upper pan, provided with an overflow 7 and a funnel 5.

Pan 2 is equipped with an opening 8 and a spout 9. Pan 3 has a funnel 10, a discharge spout 11 and part of one side cut away as shown at 12 in Fig. 8.

The cream to be cooled is poured into the upper part 4 of funnel 5 through strainer 6 and fills pan 2 to the level of overflow 9.

Pan 1 is filled with cold water, iced if preferred. Upon reaching the level of overflow 7, the water will empty, as shown in Fig. 2, into lower pan 3, by way of spout 7, which extends through opening 8 into funnel 10, from where it leaves the apparatus through aperture 11. For the sake of economy the iced water may be used repeatedly over again and as the cream in pan 2 is practically surrounded by cold water and presents a considerable cooling surface, as shown in Figs. 1 and 2, the cooling takes place rapidly and can therefore be continuous.

Having thus described the invention, what I claim is:

1. In combination, three superimposed pans, the outer pan being provided with an outlet and having a portion of one of its upright walls cut away, a spout on the intermediate pan extending through said cutaway portion of said outer pan, communicating means between the innermost pan and the outer pan, and a funnel leading through the innermost pan into the intermediate pan.

2. In combination, three superimposed pans, the outer pan being provided with an outlet, an overflow spout on the intermediate pan extending through said outer pan, a funnel on said outer pan, the intermediate pan having an opening, a spout on the innermost pan leading through said opening into said funnel, and a funnel in the innermost pan leading into the intermediate pan.

In testimony whereof I affix my signature.

THOMAS EDWARD HOOKER.

Copies of this patent may be obtained for five cents each, by addressing the "Commissioner of Patents, Washington, D. C."